(12) United States Patent
Niknazar et al.

(10) Patent No.: US 12,243,519 B2
(45) Date of Patent: Mar. 4, 2025

(54) AUTOMATIC ADAPTATION OF MULTI-MODAL SYSTEM COMPONENTS

(71) Applicant: Merlyn Mind, Inc., New York, NY (US)

(72) Inventors: Mohammad Niknazar, Laramie, NY (US); Aditya Vempaty, Yorktown Heights, NY (US); Robert Smith, New York, NY (US); Amol Nayate, Yorktown Heights, NY (US); Javier Villafana, Long Beach, CA (US); Ravindranath Kokku, Yorktown Heights, NY (US); Shom Ponoth, Irvine, CA (US); Sharad Sundararajan, Union City, NJ (US); Satya Nitta, Cross River, NY (US)

(73) Assignee: Merlyn Mind, Inc., New York, NY (US)

( * ) Notice: Subject to any disclaimer, the term of this patent is extended or adjusted under 35 U.S.C. 154(b) by 582 days.

(21) Appl. No.: 17/518,099

(22) Filed: Nov. 3, 2021

(65) Prior Publication Data
US 2023/0134400 A1 May 4, 2023

(51) Int. Cl.
G10L 15/20 (2006.01)
G06F 3/16 (2006.01)
(Continued)

(52) U.S. Cl.
CPC ............... *G10L 15/20* (2013.01); *G08B 5/22* (2013.01); *G10L 15/01* (2013.01); *G10L 15/063* (2013.01);
(Continued)

(58) Field of Classification Search
CPC ....... G10L 15/20; G10L 15/01; G10L 15/063; G10L 15/07; G10L 15/08; G10L 15/22;
(Continued)

(56) References Cited

U.S. PATENT DOCUMENTS

2013/0132089 A1* 5/2013 Fanty .................... G10L 15/30
704/270
2016/0125891 A1* 5/2016 Nyshadham ............ G10L 21/02
704/270

(Continued)

OTHER PUBLICATIONS

Iannucci et al., Room-Area Networks, 2015, ACM, whole document (Year: 2015).*

*Primary Examiner* — Sonia L Gay
(74) *Attorney, Agent, or Firm* — Duane Morris LLP

(57) ABSTRACT

A component management server computer ("server") and processing methods are disclosed. In some embodiments, the server is programmed to continuously receive input data regarding what is happening in the physical room from one or more input devices. The server is programmed to then detect an utterance of a spoken word from the input data and generate one or more sound metrics based on the input data. Based on the sound metrics as applied to certain criteria, the server is programmed to activate a component, such as an input device, variable, software system, or output device, and cause one or more output devices to execute an action that alerts a user of the activated component. The server can also be programmed to turn on, off, up, or down any of the components based on the activated component.

21 Claims, 7 Drawing Sheets

(51) Int. Cl.
  *G08B 5/22*   (2006.01)
  *G10L 15/01*  (2013.01)
  *G10L 15/06*  (2013.01)
  *G10L 15/07*  (2013.01)
  *G10L 15/08*  (2006.01)
  *G10L 15/22*  (2006.01)
  *G10L 15/26*  (2006.01)
  *G10L 25/60*  (2013.01)
  *G10L 25/84*  (2013.01)

(52) U.S. Cl.
  CPC .............. *G10L 15/07* (2013.01); *G10L 15/08* (2013.01); *G10L 15/22* (2013.01); *G10L 25/60* (2013.01); *G10L 25/84* (2013.01); *G10L 2015/088* (2013.01); *G10L 2015/223* (2013.01)

(58) Field of Classification Search
  CPC ... G10L 25/60; G10L 25/84; G10L 2015/088; G10L 2015/223; G08B 5/22
  See application file for complete search history.

(56) References Cited

U.S. PATENT DOCUMENTS

| | | | |
|---|---|---|---|
| 2017/0125019 A1* | 5/2017 | Ganesan | H04M 1/72454 |
| 2017/0213559 A1* | 7/2017 | Agrawal | G10L 15/22 |
| 2018/0047386 A1* | 2/2018 | Garner | G10L 15/22 |
| 2019/0311718 A1* | 10/2019 | Huber | H04R 27/00 |
| 2020/0143807 A1* | 5/2020 | Ko | G10L 15/16 |
| 2020/0219525 A1* | 7/2020 | Moon | H04R 1/1016 |
| 2020/0312317 A1* | 10/2020 | Kothari | H04L 67/125 |
| 2020/0341912 A1* | 10/2020 | Vempaty | G06F 13/10 |

* cited by examiner

AUTOMATIC ADAPTATION OF MULTI-MODAL SYSTEM COMPONENTS

FIELD OF THE DISCLOSURE

One technical field of the present disclosure is facilitating and enhancing user physical activities through digital user interfaces. Another technical field is real-time, intelligent processing and transmission of multimedia communications related to various input and output devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Today, systems comprising multiple components are enabled to regularly interact with humans, thus offering multiple modalities for human-computer interaction. A component within a system may include input devices such as microphones and keyboards, output devices such as speakers and display screens, software systems such as automated speech recognition (ASR) and noise detection systems, and variables such as a hotword choice for triggering the input of commands to the system and a determination of whether closed captioning is enabled on an output device that exists within the system. Example modalities of human-computer interaction is for the system to accept input data from users using a specific type of microphone and transmit output data to users using a specific type of display screen or graphical user interface.

Different components of a system have different features or are associated with different capabilities that may be suited for different setups in a physical room. The environment where the system is placed, such as a noisy large classroom compared to quiet small office, and the user using it, such an adult male compared to a small child, play a significant role in identifying the best suited system components for optimal system performance and user experience. Techniques are desired to provide a way to automatically adapt and recommend the most appropriate components for a given setup.

DETAILED DESCRIPTION

Figure 1:
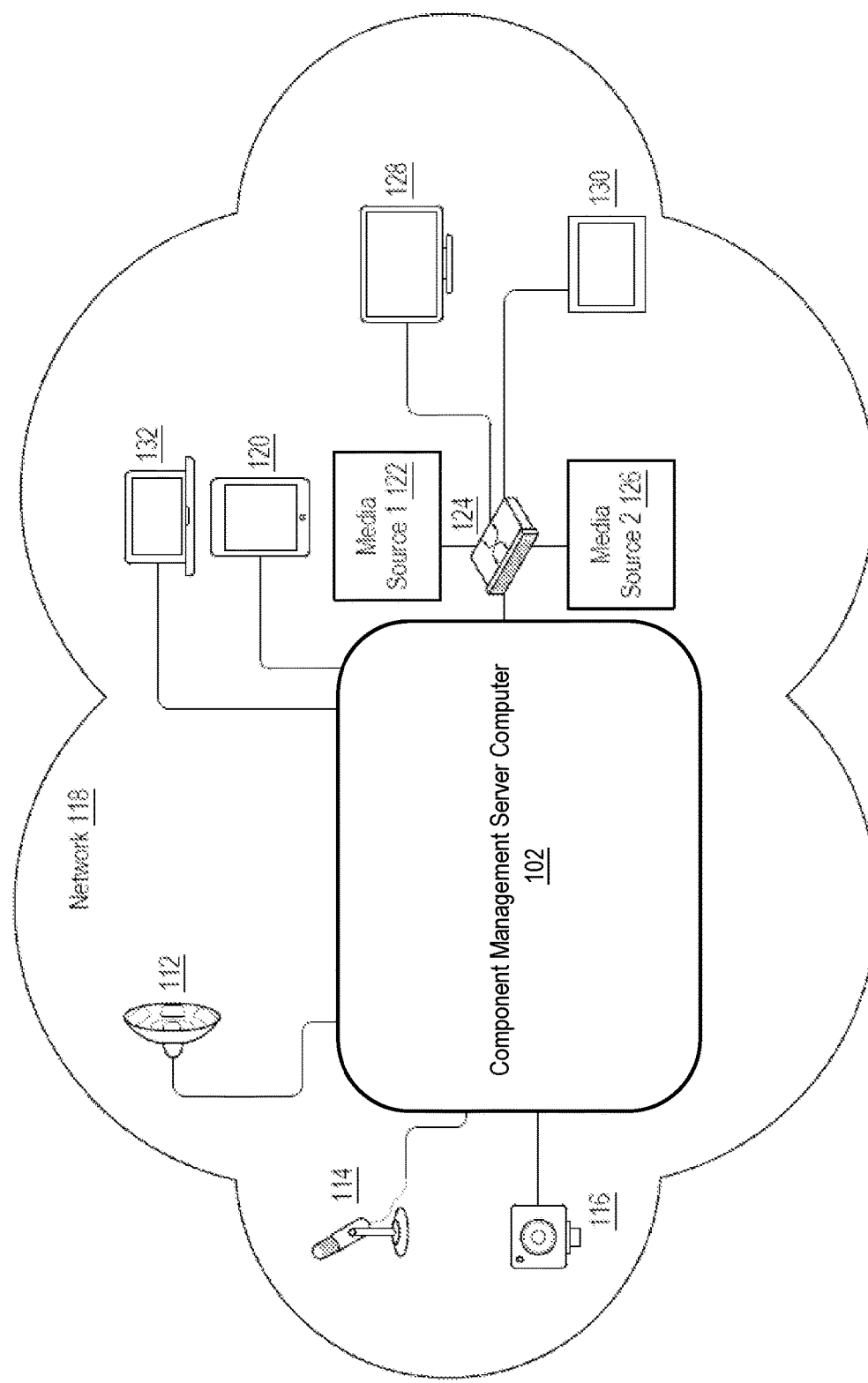
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. GENERAL OVERVIEW
2. EXAMPLE COMPUTING ENVIRONMENTS
3. EXAMPLE COMPUTER COMPONENTS
4. FUNCTIONAL DESCRIPTIONS
   4.1. CONFIGURING COMPONENT MANAGEMENT
   4.2. IMPLEMENTING COMPONENT MANAGEMENT
5. EXAMPLE PROCESSES
6. HARDWARE IMPLEMENTATION
7. EXTENSIONS AND ALTERNATIVES 1. General Overview A component management server computer ("server") and processing methods are disclosed. In some embodiments, the server is programmed to automatically adapt a multi-component system to a physical room. The server is programmed to receive and analyze digital sound data, activate a component based on the digital sound data and criteria, and cause one or more output devices to execute an action that alerts a user of the activated component.

In some embodiments, the server is configured to continuously receive input data generated by an input device in a physical room. The input data may comprise digital sound data and may be stored the by server in a database. Digital sound data may be stored for a predetermined time intervals. For example, each passing second of time may trigger a recording of a 15 second segment of digital sound data captured by a microphone input device which may be stored for a fixed amount of time.

In some embodiments, the server is programmed to detect an utterance of a spoken word from the digital sound data. The detecting may include the server processing the digital sound data using a software system or other applicable techniques to identify a spoken word, such as a hotword, that is mapped to an executable action within the system.

In some embodiments, the server is programmed to, in response to the detection of the utterance of the spoken word, generate one or more sound metrics based on the digital sound data. For example, a sound metric that may be generated is a signal-to noise ratio (SNR) metric, which indicates the power of speech to noise in a given audio clip. As another example, a sound metric that may be generated is a noise level metric. A noise level metric describes the power of noise in a given audio clip and may be calculated using any applicable technique. As another example, a sound metric that may be generated is a reverb metric. A reverb metric, such as a RT60 value, describes the reverb or acoustics of a physical room and may be calculated using any applicable technique.

In some embodiments, the server is programmed to, when one or more of the sound metrics satisfies one or more criteria, activate a component. Activating the component may include the system automatically connecting the component or turning the component on and turning another component off. For example, if an input device component is activated, the server may automatically connect the activated input device for continuously receiving audio signals.

In some embodiments, the server is programmed to cause one or more output devices to execute an action that alerts a user of the activated component. For example, the server may transmit a command to an output display device to display a particular message, such as an alert, that alerts a user that a new input device was activated to receive input from the user. As another example, the server may transmit a command to an output speaker device to play a particular message, such as a recommendation, that audibly informs a user that a different input device may provide for better recording quality if it were to be activated to receive input from the user.

The server offers several technical benefits and improvements over past approaches. The server enables automatic adaptation of components in a physical room. By automatically customizing the configuration of system components to the user and environment, an opportunity is provided to use the system in an optimal manner for the given setup. By automatically detecting performance issues and activating appropriate components or tuning component parameters, the server improves the success rate of the system in processing user input and reduces goal completion time of the system via inter-device communication. In addition, by properly and effectively activating and configuring optimal components, the server enables real-time, multi-sensory communication and enhances interactive user experience in the physical room. Furthermore, by being located in the same physical room as the components, the server helps conserve network resource utilization and reduce response time, as computation and interaction with the components generally takes place directly in the physical room.

2. Example Computing Environments

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a component management server computer 102 ("server") and a component system, including various components such as one or more integrated devices 132 and 120 which integrate input and output capabilities, a media switch 124, one or more input devices 114, 116, 122, and 126, and one or more output devices 112, 128, and 130. Other components may exist, such as various software systems and variables that are accessible to the server 102 over the networks 118 or stored and hosted by the server 102. The server can be communicatively coupled with each component of the component system via one or more networks 118 or cables, wires, or other physical components.

In some embodiments, the server 102 broadly represents one or more computers, virtual computing instances, and/or instances of a server-based application that is programmed or configured with data structures and/or database records that are arranged to host or execute functions including but not limited to managing the component system, including selecting and activating various components such as input or output (I/O) devices or software components based on data inputted by the input devices and providing notifications and recommendations of the selections and activations through the output devices. In certain embodiments, the server 102 can comprise a controller that provides a hardware interface for one or more components in the component system. For example, the server 102 can have an audio controller that communicates with I/O devices that handle audio data or a camera controller that specifically communicates with a camera. The server 102 is generally located in the physical room to help achieve real-time response.

In some embodiments, the component system can comprise any number of input devices, output devices, media switches, software systems, variables, or any other component. An input device typically includes a sensor to receive data, such as a keyboard to receive tactile signals, a camera to receive visual signals, or a microphone to receive auditory signals. As an example, an input device may comprise a microphone such as a farfield microphone, a nearfield microphone without any button, a remote control unit (RCU) microphone with a button to activate hotword or active listening. Generally, there can be a sensor to capture or measure any physical attribute of any portion of the physical room. Additional examples of a physical attribute include smell, temperature, or pressure. There can also be sensors to receive external signals, such as a navigation device to receive satellite GPS signals, a radio antenna to receive radio signals, or a set-top box to receive television signals. These sensors do not normally receive signals generated by a user but may still serve as media sources. An output device is used to produce data, such as a speaker to produce auditory signals, a monitor to produce visual signals, or a heater to produce heat. An integrated device integrates input features and output features and typically includes a camera, a microphone, a screen, and a speaker. Example of an integrated device include a desktop computer, laptop computer, tablet computer, smartphone, or wearable device. A media switch typically comprises a plurality of ports into which media devices can be plugged. The media switch is configured to then re-direct data communicated by media sources to output channels, thus "turning on" or "activating" connections with specific output devices in accordance with instructions from the server 102. In general, one or more of the input devices can be activated to capture user actions in addition to or instead of other activities in the physical room. The activated input devices can be dedicated to such use or can concurrently capture other activities in the physical room. For example, the microphone capturing spoken words from a user in the physical room can be connected with a speaker to broadcast the spoken words, and the microphone can also capture other sounds made in the physical room.

In this example, the media switch 124 can comprise many ports for connecting multiple media and I/O devices. The media switch 124 can support a standard interface for media transmission, such as HDMI. The media devices 122 and 126 communicating with the media switch 124 can be video sources. The server 102 can serve as an intermediary media source to the media switch 124 by converting data received from certain input devices to a format compatible with the communication interface supported by the media switch 124. The media devices 128 and 130 communicating with the media switch 124 can include a digital audio device or a video projector, which may be similar to other output devices but being specifically compatible with the communication interface supported by the media switch 124. The additional input devices 114 and 116 can be a microphone and a camera. The integrated devices 132 and 120 can be a laptop computer and a mobile phone. The server 102 and the components of the component system can be specifically arranged in the physical room to maximize the communication efficiency and overall performance.

The networks 118 may be implemented by any medium or mechanism that provides for the exchange of data between the various elements of FIG. 1. Examples of networks 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 is programmed to continuously receive data regarding what is happening in the physical room from the input devices, such as the input devices 114 and 116. The server 102 is programmed to then detect an utterance of a spoken word from the input data and generate one or more sound metrics based on the input data. Based on the sound metrics as applied to certain criteria, the server 102 is programmed to activate a component, such as an input device, variable, software system, or output device, and cause one or more output devices to execute an action that alerts a user of the activated component. The server 102 can also be programmed to turn on, off, up, or down any of the I/O devices or connect additional I/O devices based on the sound metrics.

3. Example Computer Components

Figure 2:
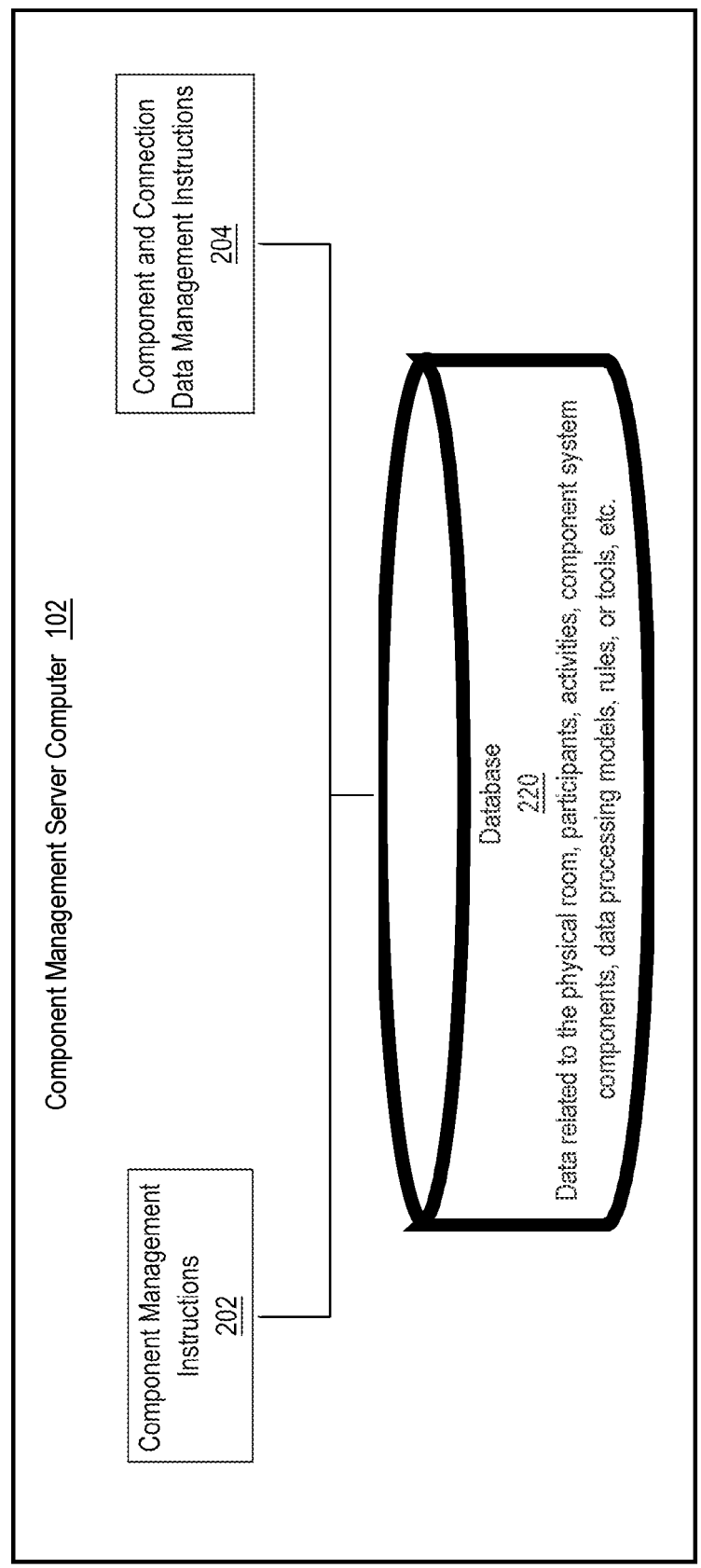
FIG. 2 illustrates example computer components of a component management server computer in accordance with the disclosed embodiments.

FIG. 2 illustrates example components of the component management server computer in accordance with the disclosed embodiments. This figure is for illustration purposes only and the server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 can comprise component management instructions 202 and component and connection data management instructions 204. In addition, the server 102 can comprise a database 220.

In some embodiments, the component management instructions 202 enable management of and communication with various system components including input devices, output devices, integrated devices, media devices, media switches, software systems, and/or other system components. The management may include analyzing input data and using the results of the analyzing to select and/or activate components based on certain criteria or thresholds. The management may also include turning on or shutting off a component such as an I/O device, adjusting the sensitivity of an input device, adjusting the intensity of an output device, connecting multiple I/O devices (which may include integrate devices or media devices herein), activating a software system for processing input data, enabling/disabling specific functions (e.g. closed captioning) on an output device, modifying values of variables of specific hardware or software systems, selecting a specific hotword recognized by specific hardware or software systems as a data input triggering event, and generating recommendations. The communication can include receiving data regarding what is happening in the physical room through an input device or another component and conveying the process or result of analyzing the received data back to the physical room by displaying a message, such as a recommendation or alert, on a graphical user interface of a device, playing of a sound that may include a message by a device, and/or vibrating of a device.

In some embodiments, the component and connection data management instructions 204 enable management of data regarding the component system components, including vendor-provided technical data of the input devices, output devices, or software systems, physical environment variables, or user-provided specifications or preferences. Such data enable the selection and/or activation of the component system components based on various criteria. The management may include soliciting relevant data from device vendors or users and storing them in a storage device or measuring environmental characteristics of the physical room in which the component system is located. The management may also include automatically extracting identification, type, or other important features of the component system components from the vendor-provided data. In addition, the management may include automatically generating certain data for referring to or ranking the component system components from the vendor-provided data.

In some embodiments, the database 220 is programmed or configured to manage relevant data structures and store relevant data for functions performed by the server 102. The relevant data may include data related to the physical room, participants or users of the component system in the physical room, activities, component system components, software systems such as data processing models or tools, and so on. The data related to the physical room can include environment characteristics, such as the arrangement of furniture or the amount of insulation material available. The data related to the users can include user attributes, such as pronunciation habits or device access patterns. The data related to the component system components in particular can include component features, such as sensitivity, intensity, or accuracy, and mappings between component features and environment characteristics or user attributes.

4. Functional Descriptions 4.1. Configuring Component Management

In some embodiments, the server 102 is programmed to receive and store component data. For example, the server 102 is programmed to receive a list of components in a component system. A component comprises a device, software system, or variable. A component may include an input device, output device, a software system, and variables that affect performance of the component system such as a spoken word/hotword recognized by the component system. For example, the input devices can include a camera, a microphone, a keyboard for a computing device, or another sensor configured to detect and input sensory signals in real time. The output devices can include a speaker to produce auditory signals, a monitor to produce visual signals, a heater to produce heat, or another device configured to produce and output sensory signals in real time. A software environment or platform can include an ASR system. For example, an ASR system may be configured to accept digital audio data as input data and process the input data to transcribe the voice in strings as output. A variable can describe a particular attribute of a component such as a functionality or property of a component. A variable may include a physical attribute such as insulation material of a physical room, distance to microphone, or speech characteristics. A variable can be changed or modified as part of a multi-component system. Other variables may describe, for example, whether closed captioning is enabled in an output device or more generally, whether certain features of a component are enabled or disabled.

In some embodiments, the server 102 is programmed to determine various types of information regarding each of the list of components. The various types of information can be extracted from vendor-provided data, such as a name, a type (input or output), a category (e.g., sound, image), a capacity, a set of dimensions, a set of special features (e.g., showing colors, emphasizing bass), or a set of compatible components of the opposite type. The extraction can include applying existing text analysis techniques, such as named-entity recognition, to user guides, manuals, technical specifications, data sheets, or public data related to each of the list of components. The various types of information can be created by users, such as a hierarchical rank, as further discussed below.

Component data can be collected in advance of execution or performance of the techniques discussed herein. Component data can be collected in real time during execution or performance of the techniques discussed herein. A ranking of components can be configured in advance of execution or can be configured or modified in real time during execution. The ranking of components may include an overall hierarchical rank of components and may also specify additional metadata that including classification information for each component and specific attributes that define each respective component.

In general, when a preset condition or rule is met by data that is collected from one or more system components, the ranking of multiple components can be used to identify a component that, when activated, will improve the performance of the system to a higher degree than the current configuration. For example, when the noise level is determined to be high or when an accent of a user is determined to be heavy, a microphone that is ranked as producing more accurate output than the currently activated microphone (e.g., one with better sensors or one that needs to be used at a close distance) or a type of input device that is ranked as producing more accurate output than the currently activated output (e.g., a keyboard vs. a microphone) is to be selected from the ranking of multiple components.

The hierarchical rank can provide a hierarchical classification of components and a rank within each class. For example, one class can correspond to all output devices, which may contain a first class corresponding to all speakers and a second class corresponding to all screens. The first class can be ranked before the second class, and a first speaker can also be ranked before a second speaker. Such ranking can also be automatically derived from the vendor-provided data. For example, the speakers in the first class can be ranked by default by the frequency response. The hierarchical ranking can be used to select and/or activate a smaller set of components from a larger set of components. Default components may be identified within each class.

The ranking may include information about not only device or component capabilities but also user usage patterns. For example, a new device should be activated because the device is positioned closer to a user in a physical room, the device is a high preference of the user, the device is good at capping sound volumes because the user tends to speak too loud, etc. In addition to ranking among input devices of the same type (e.g., all microphones) and ranking among input devices of different types (e.g., microphones, keyboards, etc.), additional rankings may include ranking among different components (e.g., input devices, software choices, software parameters (e.g., hotword, threshold) choices, room arrangement. In some embodiments, instead of or in addition to simple rules or criteria that govern when certain components are selected and activated, machine learning could be used to capture more complex relationships between data collected from components and achieving optimal system performance.

4.2. Implementing Component Management

In some embodiments, the server 102 is programmed to activate various components in accordance with received data and/or criteria. Based on the activated component(s) the server 102 may be further programmed to turn on, off, up, or down or connect or disconnect various components. The server 102 is configured to continuously receive input data generated by a default input device in a physical room. The input data may comprise digital sound data and may be stored by the server 102 in the database 220. Digital sound data may be stored for a predetermined time intervals. For example, the server 102 can be configured to keep a recording of sounds captured in a physical room during the last 15 seconds at any time when no predetermined event is detected. A predetermined event can be the utterance of one of the predetermined hotwords, which is typically followed by the communication of a user command or request. The system 102 can be configured to, upon detection of a predetermined event, start actually "listening" and save all the recording until the detection of an event corresponding to the end of the user request. It is often easier for a user to communicate requests via speech. Therefore, input data in auditory form is often expected. In the multi-modal environment, other modes of user input are possible, such as touch input via a touch screen or gesture input via a camera.

In some embodiments, the server 102 is programmed to detect an utterance of a spoken word from the digital sound data. The detecting may include the server 102 processing the digital sound data using ASR or other applicable techniques to identify a spoken word, which is mapped to an action within the system. A spoken hotword can be separately identified using a hotword detection system, which may be specifically trained using machine learning techniques to recognize only hotwords or their variants, which may be spoken with different accents, for example.

In some embodiments, prior to or in response to the detection of the utterance of the spoken word, the server 102 is programmed to generate one or more sound metrics based on the digital sound data. For example, a sound metric that may be generated is a noise level metric. A noise level metric describes the power of noise in a given audio clip and may be directly measured from a physical room where no other sound source is present or calculated from an audio mix noise and non-noise sounds using an existing technique, such as Wiener filtering or a modern machine learning method. As another example, a sound metric that may be generated is a SNR ratio metric. A SNR ratio metric indicates the power of speech to noise in a given audio clip. As another example, a sound metric that may be generated is a reverb metric. A reverb metric, such as a RT60 value, describes the reverb or acoustics of a physical room and may be calculated using any applicable technique.

In some embodiments, when one or more of the sound metrics satisfies one or more criteria, the server 102 is configured to activate a component for use instead of or in conjunction with components already in use. Activating the component may include the system automatically connecting the component or turning the component on and turning another component off. For example, if an input device component is activated, the server 102 may automatically connect the activated input device for continuously receiving audio signals.

In some embodiments, when a component is activated, the server 102 is configured to cause one or more output devices to execute an action that alerts a user of the activated component. For example, the server 102 may transmit a command to an output display device to display a particular message, such as an alert, that alerts a user that a new input device was activated to receive input from the user. As another example, the server 102 may transmit a command to an output speaker device to play a particular message, such as a recommendation, that audibly informs a user that a different input device may provide for better recording quality if it were to be activated to receive input from the user. As another example, the server 102 may transmit a command to a RCU to vibrate, which indicates that that a new input device was activated to receive input from the user. Any combination of alert, recommendation and component may be used to execute such actions.

In some embodiments, the selection and/or activation of a particular output device to execute an action that alerts a user of the activated component is based on the amplitude of the one or more sound metrics. For example, if a detected noise level measured by a first sound metric is extremely high, an action such as an audible recommendation is played especially loud by an output device to surpass the detected noise level. As another example, if a detected noise level measured by a second sound metric is extremely high, an output device that displays a recommendation on a display, instead of an output device that plays an audible recommendation through a speaker, is activated to display a recommendation.

Figure 3:
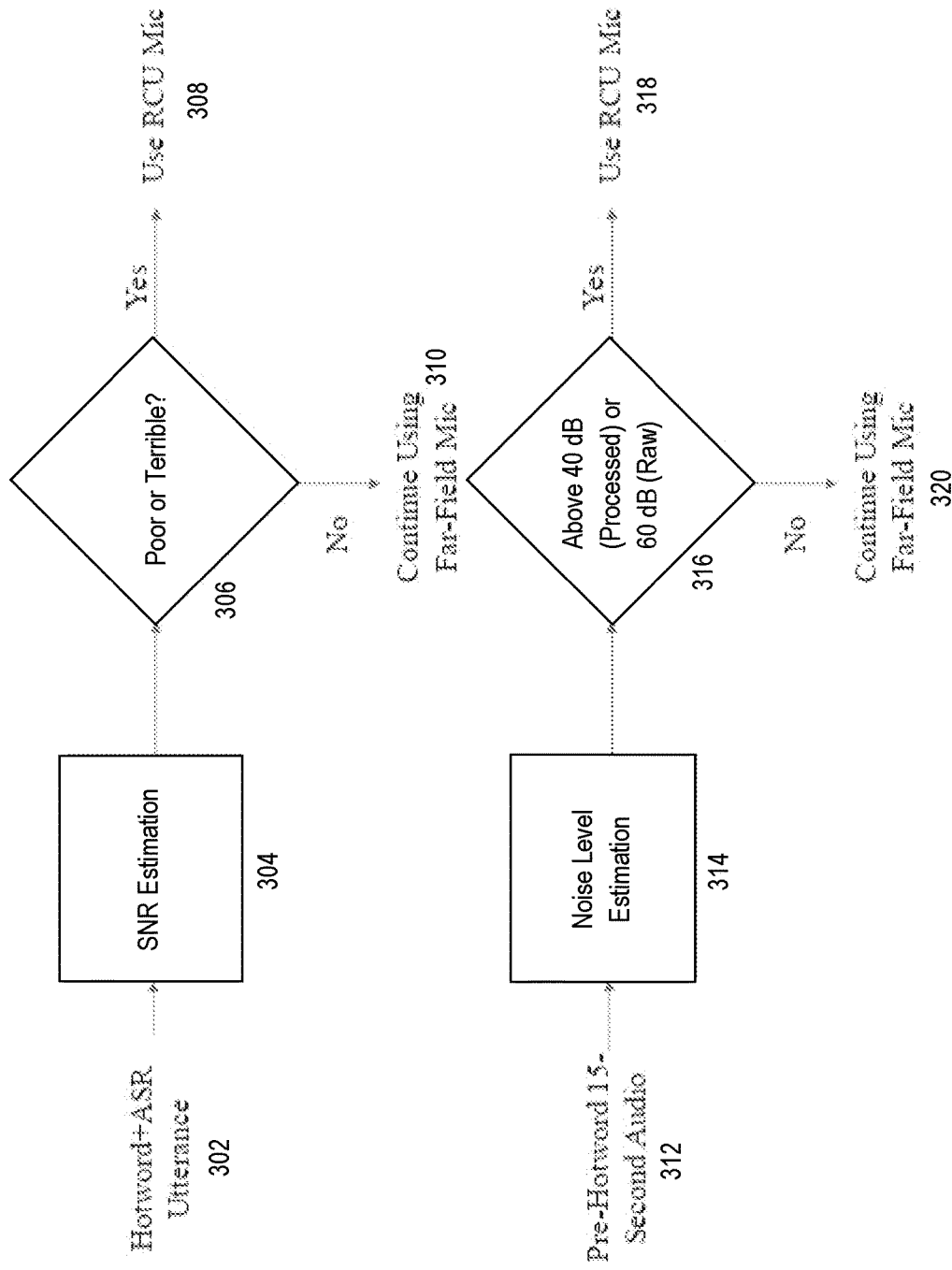
FIG. 3 illustrates an example process of selecting and/or activating an input device based on derived sound metrics.

FIG. 3 illustrates an example process of activating an input device based on derived sound metrics. In step 302, the server 102 is programmed to receive input data comprising digital sound data. Based on the digital sound data, the server 102 is programmed to detect an utterance of a spoken word, such as a hotword, using a speech analysis or processing technique as described herein. For example, the hotword can be "Hey Merlyn". In step 304, the server 102 is programmed to generate one or more sound metrics based on the detected utterance. These sound metrics are helpful because even when an utterance of a hotword can be detected, utterances of additional words in a subsequent user command that may be less recognizable may not be detected unless the system configuration is improved. The first sound metric can be the SNR. For example, the SNR of the utterance of "Hey Merlyn" can be measured to be 40 decibels (dB). In step 306, the server 102 is configured to determine whether the first sound metric is below a first threshold. For example, the first threshold could be 50 dB, which should be higher than the calculated 40 dB. In step 308, when the first sound metric is less than the first threshold, which means that the desired signal, such as human speech, is much less than the noise level, a new input device is activated for receiving audio input. For example, if a default audio device that was used to obtain the input data that was received in step 302 is a farfield microphone, a new input device such as a RCU microphone is activated as an input device for obtaining further audio input. The new input device may be activated based on a hierarchical ranking of input devices stored in the system, or another mapping which indicates that the RCU microphone is better suited for improving the SNR metric that was generated in step 304. In step 310, when the first sound metric is no less than the first threshold, no new input device is activated for receiving audio input. For example, if a default audio device that was used to obtain the input data that was received in step 302 is a farfield microphone, because the first sound metric that was calculated based on the input data obtained from the farfield microphone satisfies the threshold, no new input device is activated for obtaining further audio input.

In step 312, the server 102 is programmed to receive input data comprising digital sound data. The received input data may be the same input data that is received in step 302. Based on the digital sound data, the server 102 is programmed to detect an utterance of a spoken word, such as a hotword using a speech analysis or processing technique such as provided by a hotword detection system. The server 102 may then activate a subset of the digital sound data that corresponds to a time interval that occurs before the detected hotword for further analysis. For example, once the utterance of a hotword such as "Hey Merlyn" is detected, digital sound data that corresponds to a 15 second time interval that occurred before the detected hotword is activated for analysis, which is expected to reflect the current noise level. Alternatively, this analysis can be performed sometime prior to detecting an utterance of a hotword. In step 314, the server 102 is programmed to generate a second sound metric based on the detected utterance. The second sound metric can be a noise level estimation and can be generated using any applicable technique. For example, the noise level of the digital sound data corresponding to a 15 second time interval that occurred before the utterance of "Hey Merlyn" can be measured to be 20 decibels (dB). In step 316, the server 102 is configured to determine whether the second sound metric is above a second threshold. Such a threshold could be determined based on a common noise level chart. For example, the second threshold could be 30 dB corresponding to whispering, which is not exceeded by the calculated 20 dB. In step 318, when the second sound metric is greater than the second threshold, which means that the noise level is too high, a new input device is activated for receiving audio input. For example, if a default audio device that was used to obtain the input data that was received in step 312 is a farfield microphone, a new input device such as a RCU microphone is activated as an input device for obtaining further audio input. The new input device that is activated may be activated based on a hierarchical ranking of input devices stored in the system, or another mapping which indicates that the RCU microphone is better suited for improving the noise level metric that was generated in step 314. In step 320, when the second sound metric is no greater than the second threshold, no new input device is activated for receiving audio input. For example, if a default audio device that was used to obtain the input data that was received in step 312 is a farfield microphone, because the second sound metric that was calculated based on the input data obtained from the farfield microphone satisfies the threshold, no new input device is activated for obtaining further audio input. In some embodiments, steps 302-310 and steps 312-320 may run concurrently or separately.

In some embodiments, the server 102 is configured to cause one or more output devices to execute an action that alerts a user of the activated component. For example, when a new component such as an input device is activated in steps 308 and/or 318, the server 102 may cause an output device to display and alert message on a graphical user interface, such as "Your speech is weak compared to noise in the room. Please use the RCU mic if the device is not hearing you well." or "Your room is very noisy. Please use the RCU mic if the device is not hearing you well." An RCU microphone may be recommended over another microphone such as a farfield microphone because the RCU microphone a) is wireless and can be placed closer to an audio source and/or b) can be triggered with the press of a button to record or listen for audio signals.

In some embodiments, if the first sound metric satisfies a first criteria and/or the second sound metric satisfies a second criteria, both indicating that the noise level is higher than desired, the closed captioned functionality of a video playing device is enabled or a display screen is used as an output device. For example, server 102 may send a command to an output device to enable closed captions on the output device. Server 102 may also transmit an alert or recommendation to an output device that alerts a user that it may benefit the user to turn on closed captions.

In some embodiments, other sound metrics can be computed, such as a reverberation level (preferably lower than a threshold), a speech volume (preferably within a range). The same analysis also applies to speech characteristics, such as a speech recognition accuracy score (preferably greater than a threshold). In certain embodiments, other types of components can be recommended. For example, when the SNR is too low or the noise level is too high relative to predetermined thresholds, the server 102 can be programmed to recommend issuing non-audio commands, such as typing in a command or clicking on a command icon, instead of issuing more audio commands using another input device.

Figure 4:
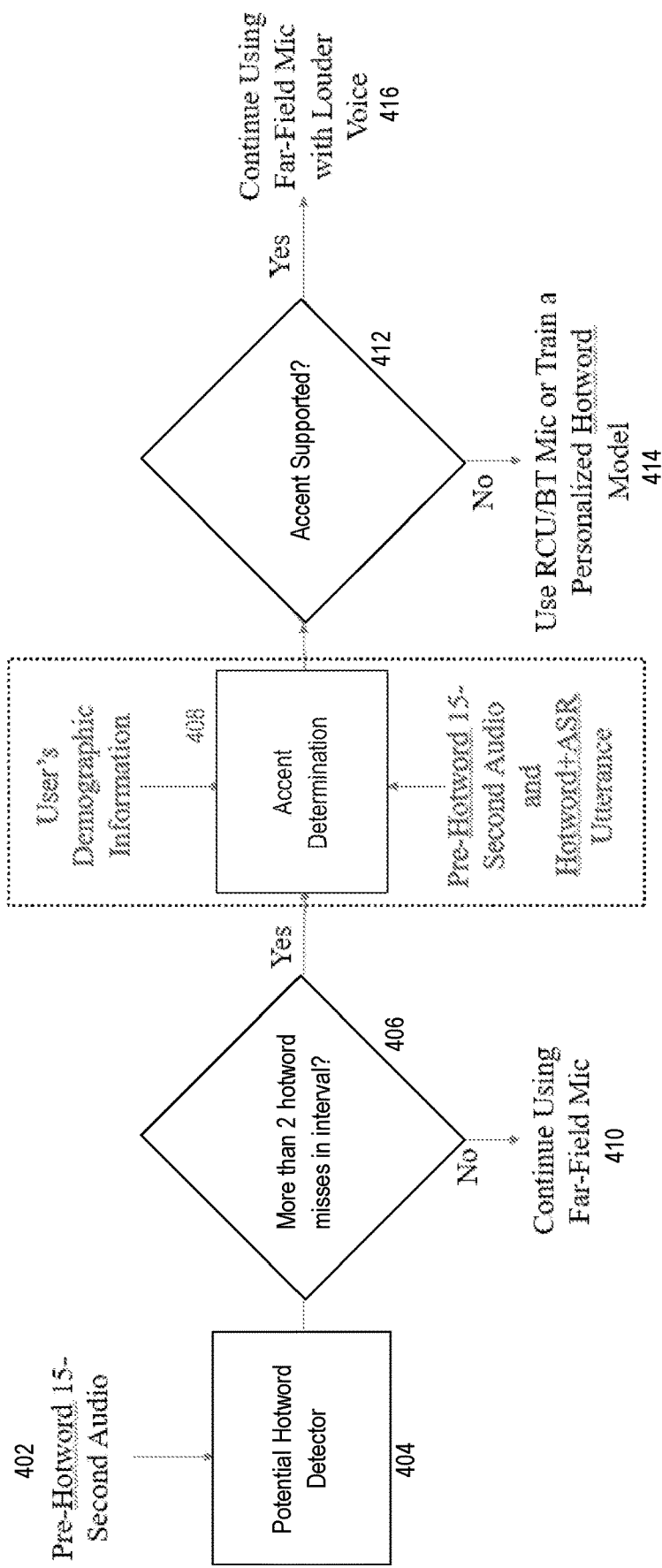
FIG. 4 illustrates an example process of selecting and/or activating an input device or hotword based on input data satisfying certain criteria.

FIG. 4 illustrates an example process of activating an input device or hotword based on input data satisfying certain criteria. In step 402, the server 102 is programmed to receive input data comprising digital sound data. Based on the digital sound data, the server 102 is programmed to detect an utterance of a spoken word of a user, such as a hotword using a speech analysis or processing technique such as provided by a hotword detection system. The server 102 may then activate a subset of the digital sound data that corresponds to a time interval that occurs before the detected hotword for further analysis. For example, once the utterance of a hotword such as "Hey Merlyn" is detected, digital sound data that corresponds to a 15 second time interval that occurred before the detected hotword is activated for processing. In step 404, the subset of digital sound data activated in step 402 is processed by a potential hotword detector software system to determine a number of potential hotword misses that occurred in the time interval before the detected hotword. A hotword miss occurs when a user utters a hotword that is not detected as a hotword by the server 102. The potential hotword detector performs in-depth analysis and processing using various techniques to determine the number of potential hotword misses. Any applicable digital data or sound processing techniques may be used. The potential hotword detector may be stored and executed by server 102 or may be hosted remotely and accessed by server 102 over the networks 118. In certain embodiments, the potential hotword detector 404 can be (continuously) executed sometime prior to detecting an utterance of a hotword. In other embodiments, a hotword can be not only a word or phrase that prompts the server 102 to listen for a command but also a word or phrase that are part of a commonly used command. For example, the user may often say "play the latest music by XYZ". Detecting the words "latest", "music", or "XYZ" can be similarly performed.

In one embodiment, the potential hotword detector comprises a trained machine learning model that is trained based on training data that is specific to a given hotword. For example, the training data may include multiple data records where each data record includes digital sound data that includes an utterance of a spoken word, and a corresponding indication or confidence value of whether the respective utterance is a specific hotword.

In one embodiment, the potential hotword detector comprises a trained machine learning model that is trained based on training data that includes multiple syllables of a given language. Multiple sub-models corresponding to multiple syllables are trained. For example, the training data may include multiple data records where each data record includes digital sound data that includes an utterance of a syllable of a spoken word, and corresponding indications or confidence values of whether the respective utterance includes the syllable. Then, for a chosen hotword, appropriate selections of those pre-trained models corresponding to syllables of the hotword are concatenated or otherwise combined to generate the trained machine learning model.

In one embodiment, a trained machine learning model is evaluated using multiple inputs. The inputs may include digital sound data corresponding to a pre-defined time interval (e.g. 15 seconds) prior to a detected hotword event (therefore with no hotword already detected, by a hotword detection system, for instance), a normalized version of digital sound data corresponding to the pre-defined time interval prior to a detected hotword event, a denoised version of digital sound data corresponding to the pre-defined time interval prior to a detected hotword event, or a normalized and denoised version of digital sound data corresponding to the pre-defined time interval prior to a detected hotword event. For example, the normalized version of digital sound data can be configured such the highest absolute values of the normalized digital sound data is 99% of the maximum possible amplitude before clipping. As another example, a trained noise model, such as the RNNoise module that applies a combination of signal processing techniques and deep neural networks, can be used for generating the denoised version of digital sound data. In some embodiments, the trained machine learning model can be configured such that when one or more or the multiple inputs results in the trained machine learning model detecting a potential utterance of a hotword, then a potential hotword miss is identified.

In one embodiment, an ensemble of trained machine learning models is used for detecting potential hotword misses. The ensemble may include a first trained machine learning model that is trained based on training data that is specific to a given hotword and a second trained machine learning model that is trained based on training data that includes multiple syllables of a given language. As discussed above, multiple inputs can be used to evaluate a trained machine learning model. The ensemble can be configured such that when one or more or the multiple inputs results in one or more of the trained machine learning models of the ensemble of trained machine learning models detecting a potential utterance of a hotword, then a potential hotword miss is identified.

In step 406, when the number of potential hotword misses determined in step 404 is no greater than a threshold, no new input device is activated for obtaining further audio input. Additionally or alternatively, no new hotword is selected. When the number of potential hotword misses determined in step 404 is greater than a threshold, a new input device and/or new hotword is selected, as further discussed below. Additionally or alternatively, the flow proceeds to step 408. In step 408, an accent or other pronunciation characteristics of the user is determined. Accent information can be obtained from a user or using an existing accent identification tool based on demographic information associated with the user along with the digital sound data corresponding to the utterance of the detected hotword or the subset of the digital sound data that corresponds to the time interval that occurs before the detected hotword. Other characteristics may include repeated silencing or mispronunciation of certain syllables or unusual emphases on certain syllables.

In step 412, it is determined whether the accent that was determined in step 408 is supported. This can be determined by reviewing specifications of alternative hotword detection systems or hotword models and identifying any hotword detection systems or hotword models that supports the accent. This determination may also include accessing a mapping stored in database 220 that indicates specific accents or accent values that are supported or compatible with certain hotword instances and/or components. For example, a first type of accent may be compatible with the hotword "Hello Merlyn" but not "Hey Merlyn", due to the "Hello Merlyn" hotword having an additional syllable to "Hey Merlyn" rendering the speech more distinguishable. Other characteristics that may make a hotword or any word more recognizable include having consecutive syllables that are more distinguishable from one another or form a unique combination or having syllables that sound less accent specific. As another example, a second type of accent may be compatible with a wired nearfield microphone, but incompatible with a wireless Bluetooth microphone due to additional undesirable feedback caused by the Bluetooth microphone. Steps 414 and 416 offer additional examples of responses to determining whether an accent is supported. In step 414, if an accent is not supported, server 102 may activate a new input device or a new hotword for recommendation to the user and/or for receiving further input data. The activated input device or hotword may be identified, based on a mapping stored in database 220, to be compatible or preferred for the type of accent that was detected in step 408. Additionally or alternatively (e.g., when a new hotword also fails), a hotword model can be trained to identify hotwords spoken in a specific accent. Training data may include digital sound data that includes utterances of a specific hotword with the accent detected in step 408 associated with accent indications. Any applicable algorithm and machine learning techniques may be used to generate such a model. In step 416, if an accent is supported, server 102 does not activate a new input device for obtaining further audio input and generates a recommendation for display to a user. The sever 102 can further analyze the digital audio data to identify other reasons for the hotword misses. The recommendation may indicate or alert a user that the user needs to speak louder or more slowly when uttering a hotword.

As discussed above, a new or updated hotword model or hotword detection system that supports a given accent can be activated. Such a selection or activation can be performed offline.

Figure 5:
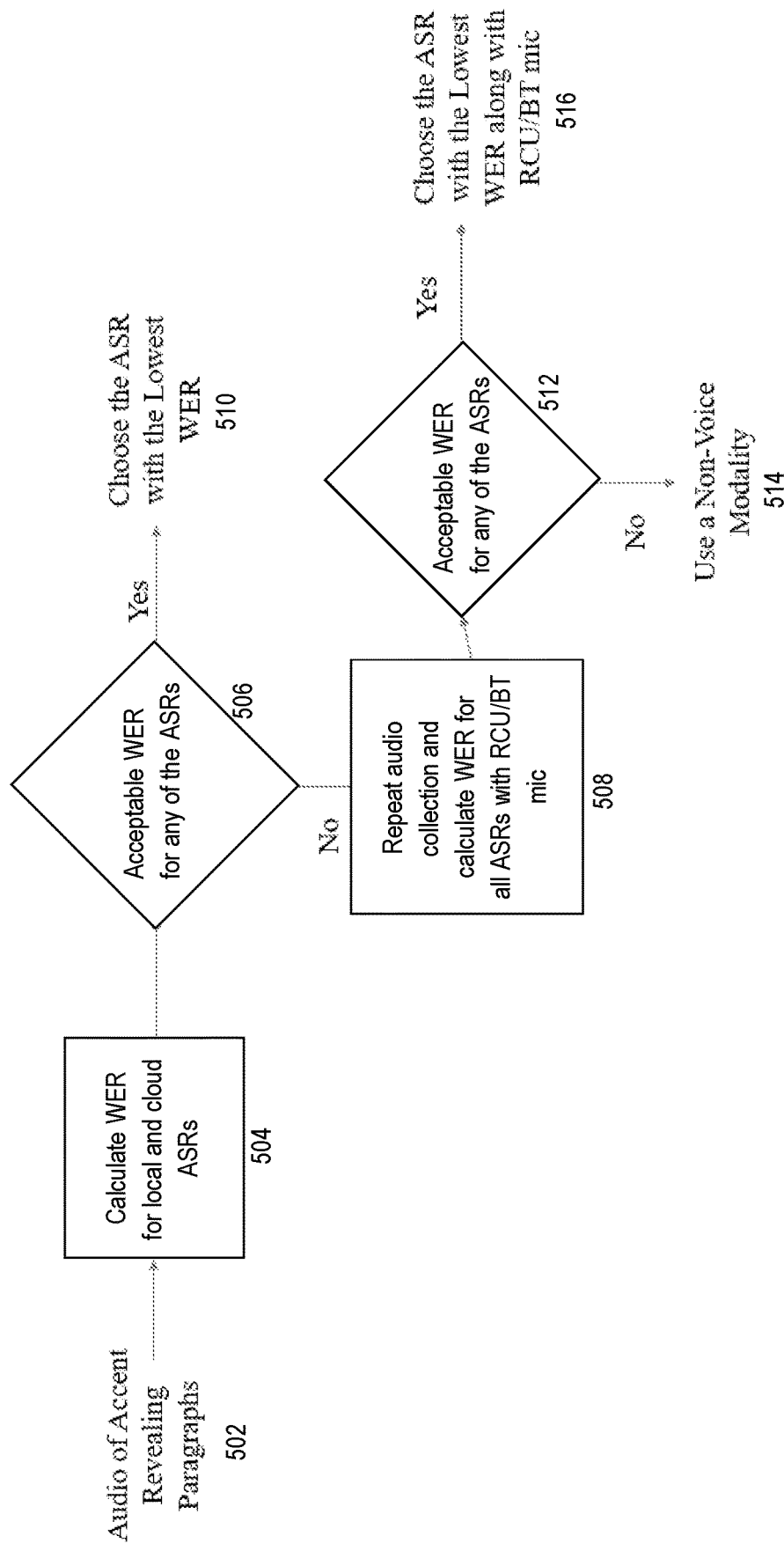
FIG. 5 illustrates an example process of selecting and/or activating an ASR system based on input data satisfying certain criteria.

FIG. 5 illustrates an example process of activating an ASR system based on input data satisfying certain criteria. In step 502, the server 102 is programmed to receive input data comprising digital sound data. For example, the digital sound data may comprise an audio recording of a user reading a predetermined sequence of words, such as a paragraph containing common accent words that are often pronounced differently in different accents.

In step 504, the server 102 is programmed to determine a word error rate (WER) metric for each ASR system of multiple ASR systems based on the digital sound data. A WER metric comprises a number of errors divided by the total words in a predetermines sequence of words. For example, a first WER metric can be determined for a local ASR system that is based on a Hidden Markov Model and hosted by server 102. A second WER metric can be determined for a cloud-based ASR system that is based on a recurrent neural network and hosted by a third party provider and accessible by server 102 over the networks 118. In step 506, the server 102 is programmed to determine whether any of the WER metrics determined in step 504 are below a threshold. In step 510, when any of the WER metrics are below a threshold, the ASR system of the multiple ASR systems that corresponds to the lowest WER metric, (e.g. the ASR system with the lowest word error rate), is activated. Once activated, the sever 102 may automatically use the activated ASR system to perform speech processing operations on any digital sound data that is subsequently received by the server 102. In step 508, when none of the WER metrics are below a threshold, steps 502 and 504 are repeated one or more times after activating a different input device to receive digital sound data and use the digital sound data as a basis for determining new WER metrics. For example, when a fairfield microphone is initially used to receive digital sound data that subsequently results in none of the determined WER metrics satisfying a threshold, a different device, such as a wireless Bluetooth microphone that is expected to capture user input more accurately than the farfield microphone, is activated to receive subsequent digital sound data. In step 512, the server 102 is programmed to determine whether any of the new WER metrics that are determined based on using the different input device to receive digital sound are below a threshold. In step 516, when any of the new WER metrics are below a threshold, the ASR system of the multiple ASR systems that corresponds to the lowest new WER metric, (e.g. the ASR system with the lowest word error rate), is activated along with the different input device. In step 514, when none of the new WER metrics are below a threshold, a different type of input device is activated to receive digital sound data. For example, a keyboard input device, which is expected to capture user input more accurately than a microphone input device, may be activated to receive digital sound data.

In some embodiments, the server 102 is programmed to receive input data comprising digital sound data. Based on the digital sound data, the server 102 is programmed to detect an utterance of a spoken word of a user, such as a hotword using a speech analysis or processing technique such as provided by a hotword detection system. The server 102 may then activate a subset of the digital sound data that corresponds to a time interval that occurs before the detected hotword for further analysis. The subset of digital sound data activated is processed by a potential hotword detector software system to determine a number of potential hotword misses that occurred in the time interval before the detected hotword. In some embodiments, when the number of hotword misses in the time interval prior to the detected hotword event is greater than a threshold, which might mean that the user has difficulty using the hotword, the server 102 is configured to enter an "open mode" to continuously processes the input data to recognize commands without requiring a hotword as a triggering mechanism. The server 102 can send a message to an output device to inform the user that it is no longer to use a hotword.

In another embodiment, when the number of hotword misses in the time interval prior to the detected hotword event is less than a threshold, the server 102 can also be configured to enter the open mode. For example, when a user is uttering a hotword continuously every few seconds, which might mean that the user frequently issues commands, the input device can always be listening for commands and will react to all utterances of speech without using a hotword as a triggering event. The server 102 may similarly alert the user via an output device that the system is continuously listening and that there is no need to say hotword to issue a command to the system.

In some embodiments, the server 102 is programmed to receive input data comprising digital sound data. Based on the digital sound data, the server 102 is programmed to detect an utterance of a spoken word of a user, such as a hotword using a speech analysis or processing technique such as provided by a hotword detection system. Based on the detecting, the server 102 is configured to generate a RT60 value estimation or a reverb classification, such as hall or chamber, which is separate from background noise but is also undesirable sound data. An RT60 value describes the reverberation level in the physical room. A reverb classification describes the type of reverberation present and may be calculated using any applicable technique. If the RT60 value is greater than a threshold or if the reverb classification indicates that a specific type of reverb exists in the room, the server 102 may recommend a modification to the physical space. For example, a message or alert may be displayed on an output device stating "Your room seems to be highly reverberant. Please either change your room or reduce reverberation by adding more furniture or hanging curtains on walls." If the RT60 value is no greater than a threshold, the server 102 may determine that a modification to the physical space is not necessary.

In some embodiments, the server 102 is programmed to continuously receive input data comprising digital sound data. Based on the digital sound data, the server 102 is programmed to detect an utterance of a spoken word of a user, such as a hotword using a speech analysis or processing technique such as provided by a hotword detection system. The server 102 is programmed to generate one or more sound metrics based on the detected utterance. The sound metrics may represent a noise level estimation and can be generated using any applicable technique or a SNR calculation as discussed herein. Based on the one or more sound metrics, the server 102 is programmed or configured to cause one or more output devices of the plurality of output devices to execute an action that alerts a user of the strength of the one or more sound metrics. For example, the action may comprise displaying a green or red indicator on a graphical user interface, where a green indicator indicates a good placement location that corresponds to an acceptable noise level estimation or SNR value, and a red indicator indicates a bad placement location that corresponds to an unacceptable noise level estimation or SNR value. The action may also comprise displaying instructions for a user to move around the physical environment in order to reduce noise. Input data may be continuously received and evaluated by the server 102 in order to provide a user with real-time updates of noise levels at the user's current location in the physical room. In some embodiments, the input data is obtained by a user in a physical room or environment using a RCU microphone.

In some embodiments, the server 102 is programmed to cause connection of at least a first component and a second component, for example, the first component being an input device and the second component being an output device. The server 102 can be programmed to receive certain data produced by an input device and simply transmit the certain data to the output device, thereby establishing connection. In other embodiments, the server 102 can be programmed to transmit an instruction for a connection to a media switch into which the input device and the output devices are plugged. The media switch is configured to, upon receiving the instruction, open the communication path between the input device and the output device such that specific data is transmitted from the input device to the output device, thereby establishing the connection. In additional embodiments, the server 102 can be plugged into the media switch serving as an input device to the media switch. Specifically, the server 102 can be programmed to convert particular data into a particular format compatible with the communication interface supported by the media switch and transmit the converted data with a specification of a particular output device also plugged into the media switch (or a corresponding port) to the media switch. The media switch is configured to, upon receiving the converted data and the specification, open the communication path between the server 102 and the particular output device such that the converted data is transmitted to the particular output device.

Various parts of the processes discussed above in this section can be combined in various manners. For example, the process illustrated in FIG. 4 may be performed following steps 310 or 312 illustrated in FIG. 3, to make sure that the noise is not an issue before addressing any issue related to accent. The process illustrated in FIG. 4 may also be performed before the process illustrated in FIG. 5 so that possible accent information gathered in determining appropriate hotwords can be used as an additional input in choosing an accent-appropriate ASR to recognize user commands. As another example, the RT60 value estimation or reverb classification can be performed in parallel to the SNR estimation and noise level estimation illustrated in FIG. 3. The outcomes of determinations including whether the reverb value satisfies one or more criteria, whether the SNR estimation satisfies one or more criteria, and whether the noise level estimation satisfies one or more criteria can be weighted and used as a basis for selecting and activating a component such as an RCU mic or farifield mic. Additional combinations of steps from FIGS. 3, 4 and 5 can form additional embodiments alone or with other embodiments discussed above.

5. Example Processes

Figure 6:
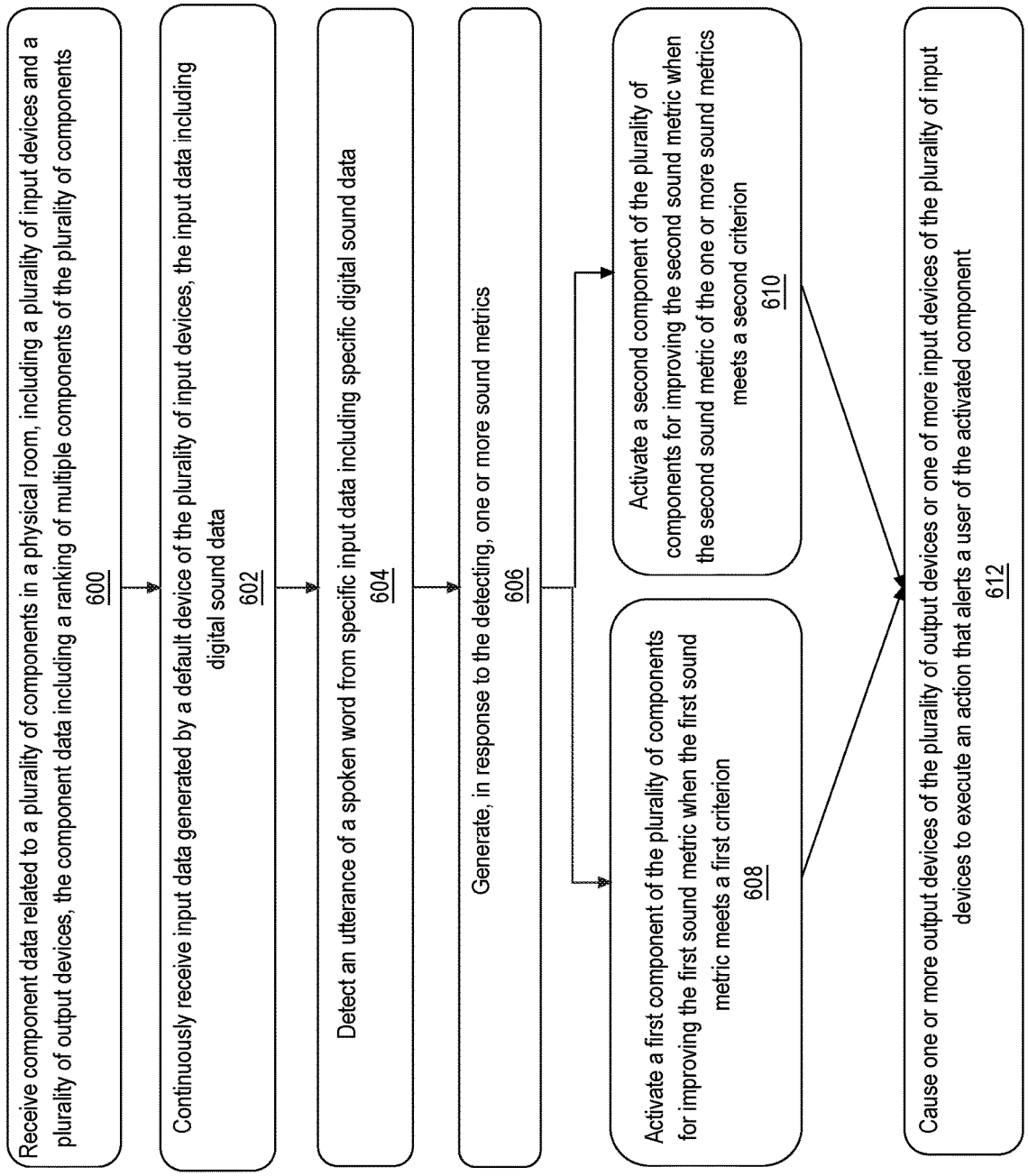
FIG. 6 illustrates an example process performed by the component management server computer of automatic adaptation of multi-modal system components.

FIG. 6 discussed below is shown in simplified, schematic format for purposes of illustrating a clear example and other embodiments may include more, fewer, or different elements connected in various manners. FIG. 6 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

FIG. 6 illustrates an example process performed by the component management server computer of automatic adaptation of multi-modal system components.

In some embodiments, in step 600, the server 102 is programmed or configured to receive component data related to a plurality of components in a physical room, including a plurality of input devices and a plurality of output devices, the component data including a ranking of multiple components of the plurality of components.

In some embodiments, in step 602, the server 102 is programmed or configured to continuously receive input data generated by a default device of the plurality of input devices, the input data including digital sound data.

In some embodiments, in step 604, the server 102 is programmed or configured to detect an utterance of a spoken word from specific input data including specific digital sound data;

In some embodiments, in step 606, the server 102 is programmed or configured to generate, in response to the detecting of step 604, one or more sound metrics. In some embodiments, the server 102 can be programmed to generate a first sound metric of the one or more sound metrics that comprises a signal-to-noise ratio metric for the specific digital sound data. In some embodiments, the server 102 can be programmed to generate a second sound metric of the one or more sound metrics that comprises a noise level metric for digital sound data corresponding to a time interval prior to detecting the utterance.

In some embodiments, in step 608, the server 102 is programmed or configured to activate a component of a plurality of components for improving the first sound metric when the first sound metric meets a first criterion.

In some embodiments, in step 610, the server 102 is programmed or configured to activate a component of a plurality of components for improving the second sound metric when the second sound metric meets a second criterion.

In some embodiments, the activating the component from steps 608 and/or 610 comprises activating an input device of the plurality of input devices that is different than the default input device to receive input data in the physical room. In some embodiments, the activated input device that is different than the default input device is activated based on a mapping that specifies a hierarchy of input devices. In some embodiments, the activating the component comprises activating an automated speech recognition (ASR) device or ASR software system to process the input data. In some embodiments, the activating the component comprises selecting a characteristic of the physical room for modification. In some embodiments, the activating the component comprises activating a hotword to be used as a triggering mechanism for identifying commands from the input data.

In some embodiments, in step 612, the server 102 is programmed or configured to cause one or more output devices of the plurality of output devices or one or more input devices of the plurality of input devices to execute an action that alerts a user of the activated component. In some embodiments, the action comprises at least one of: displaying a message on a graphical user interface, playing of a sound, and vibrating of a device.

In some embodiments, the server 102 is programmed or configured to cause implementing a connection based on the activation in steps 608 and/or 610. The server 102 can be programmed to receive data from one of the at least one component, such as an input device, and transmitting the data to another component, such as an output device. Alternatively, the server 102 can be programmed to transmit an instruction to a media switch to establish the connection.

6. Hardware Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
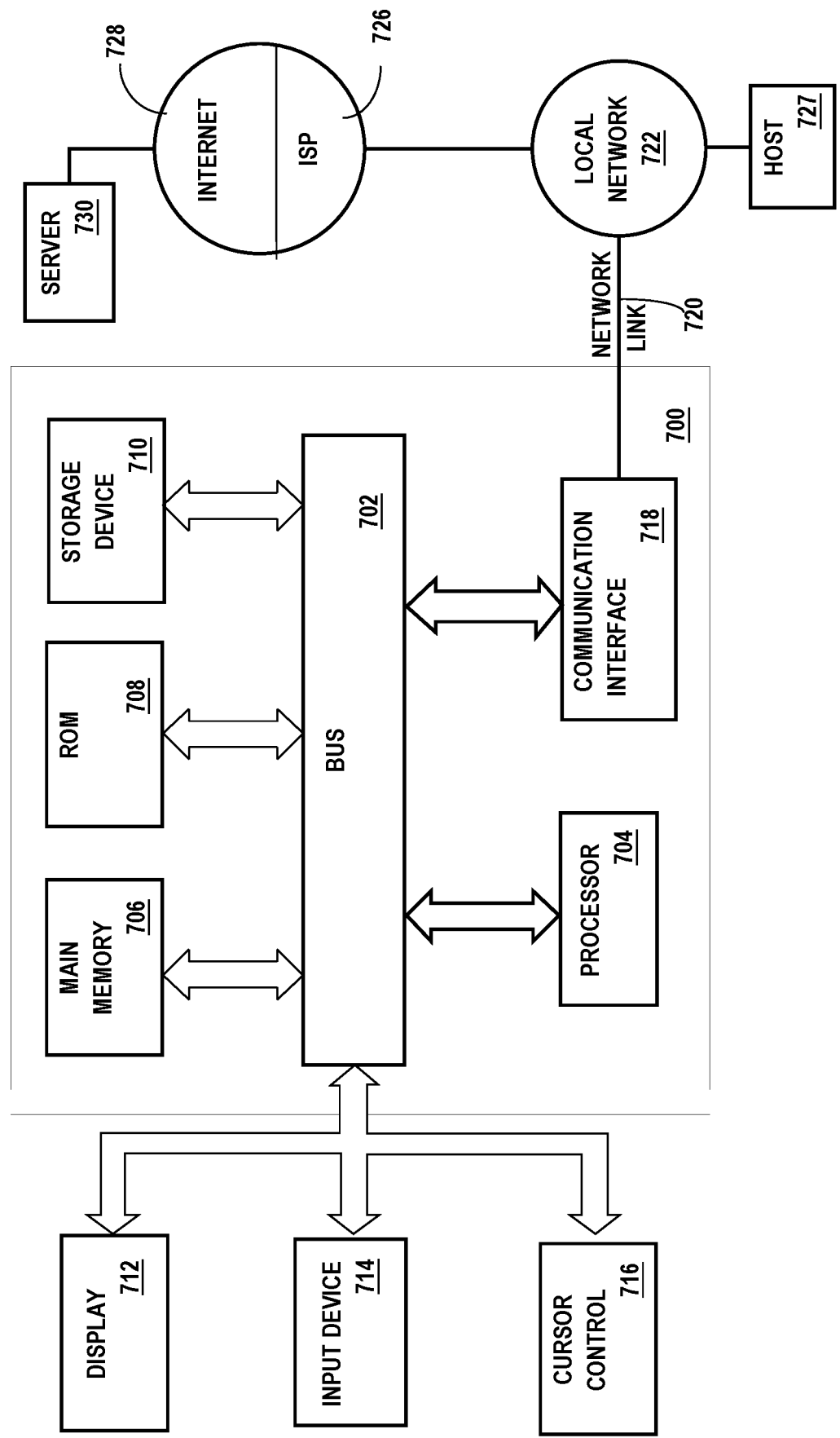
FIG. 7 is a block diagram that illustrates a computer system upon which an embodiment of the invention may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

7.0. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method of automatic adaptation in a multi-modal system, comprising:
   receiving, by a processor, component data related to a plurality of components in a physical room, including a plurality of input devices and a plurality of output devices, the component data including a ranking of multiple components of the plurality of components;
   continuously receiving, by the processor located in the physical room, input data generated by a default input device of the plurality of input devices, the input data including digital sound data;
   detecting an utterance of a spoken word from specific input data including specific digital sound data;
   generating, in response to the detecting, one or more sound metrics;
   wherein a first sound metric comprises a speech metric for the specific digital sound data;
   wherein a second sound metric comprises a noise level metric for digital sound data corresponding to a time interval prior to detecting the utterance;
   when the first sound metric of the one or more sound metrics meets a first criterion, activating a first component of the plurality of components for improving the first sound metric;
   when the second sound metric of the one or more sound metrics meets a second criterion, activating a second component of the plurality of components for improving the second sound metric,
   wherein the activating the first component or the second component comprises activating an input component of the plurality of components that is ranked higher in the ranking than the default input device to help receive the input data in the physical room;
   causing one or more input devices of the plurality of input devices or one or more output devices of the plurality of output devices to execute an action that alerts a user of the activated component.

2. The computer-implemented method of claim 1, wherein the activating the first component or the second component comprises activating an input device of the plurality of input devices that is ranked higher in the ranking than the default input device to receive the input data in the physical room.

3. The computer-implemented method of claim 1, wherein the ranking of multiple components of the plurality of components includes hierarchical classification of components and a rank within each hierarchical classification.

4. The computer-implemented method of claim 1, wherein the activating the first component or the second component comprises activating an automated speech recognition (ASR) device or ASR software system to process the input data.

5. The computer-implemented method of claim 1, wherein the activating the first component or the second component comprises selecting a characteristic of the physical room for modification.

6. The computer-implemented method of claim 1, wherein the activating the first component or the second component comprises activating a hotword to be used as a triggering mechanism for identifying commands from the input data.

7. The computer-implemented method of claim 1, the speech metric being a speech volume, the first criterion being that the speech metric falls outside a first range.

8. The computer-implemented method of claim 1, the speech metric being a speech recognition score or a signal-to-speech (SNR) ratio, the first criterion being that the speech metric is less than a first threshold.

9. The computer-implemented method of claim 1, further comprising:
   when the first sound metric meets the first criterion or the second sound metric meets the second criterion, enabling closed captioned functionality of an output device of the plurality of output devices.

10. The computer-implemented method of claim 1, wherein the action comprises at least one of: displaying a message on a graphical user interface, playing of a sound, and vibrating of a device.

11. The computer-implemented method of claim 1, further comprising:
   determining, based on the input data, a number of hotword misses in the time interval prior to a detected hotword event,
   wherein every utterance of a spoken word detected following detecting an utterance of a hotword is treated as part of a user command until a command termination condition occurs,
   wherein a hotword miss is an utterance of a hotword that was not previously detected;
   when the number of hotword misses in the time interval prior to the detected hotword event is greater than a threshold, activating an input device of the plurality of input devices that is different than the default input device in the physical room to receive the input data or activating a new hotword to be used as a triggering mechanism for identifying commands from the input data.

12. The computer-implemented method of claim 1, further comprising:
   determining, based on the input data, a number of hotword misses in the time interval prior to a detected hotword event;
   when the number of hotword misses in the time interval prior to the detected hotword event is greater than a threshold, continuously processing the input data for commands without using a hotword as a triggering mechanism and causing alerting the user that an utterance of a hotword is not required for the user to issue commands.

13. The computer-implemented method of claim 12, wherein determining the number of hotword hits or misses in the time interval prior to a detected hotword event comprises:
   using one or more trained machine learning models, determining the number of hotword misses in the time interval prior to the detected hotword event;

wherein a particular trained machine learning model of the one or more trained machined learning models is trained based on a training data that is specific to a given hotword or includes multiple syllables of a given language.

14. The computer-implemented method of claim 1, further comprising:
when the first sound metric does not meet the first criterion and the second sound metric does not meet the second criterion, computing a statistic related to hotword misses from past input data;
when the statistic meets a third criterion, identifying an accent from the past input data;
in response to determining that the accent is not supported, activating a new input device of the plurality of input devices or a new hotword to be used as a triggering mechanism for identifying commands from the input data.

15. The computer-implemented method of claim 1, wherein the activating the first component or the second component comprises activating at least one of: a farfield microphone, a nearfield microphone without any buttons, a remote control unit (RCU) microphone with a button to activate hotword or active listening.

16. A system comprising:
a processor;
a memory coupled with the processor and storing computer-implemented instructions which when executed cause the processor to perform:
receiving component data related to a plurality of components in a physical room, including a plurality of input devices and a plurality of output devices, the component data including a ranking of multiple components of the plurality of components;
continuously receiving, by the processor located in the physical room, input data generated by a default input device of the plurality of input devices, the input data including digital sound data;
detecting an utterance of a spoken word from specific input data including specific digital sound data;
generating, in response to the detecting, one or more sound metrics;
wherein a first sound metric comprises a speech metric for the specific digital sound data;
wherein a second sound metric comprises a noise level metric for digital sound data corresponding to a time interval prior to detecting the utterance;
when the first sound metric of the one or more sound metrics meets a first criterion, activating a first component of the plurality of components for improving the first sound metric;
when the second sound metric of the one or more sound metrics meets a second criterion, activating a second component of the plurality of components for improving the second sound metric,
wherein the activating the first component or the second component comprises activating an input component of the plurality of components that is ranked higher in the ranking than the default input device to help receive the input data in the physical room;
causing one or more input devices of the plurality of input devices or one or more output devices of the plurality of output devices to execute an action that alerts a user of the activated component.

17. The system of claim 16, wherein the activating the first component or the second component comprises activating an input device of the plurality of input devices that is ranked higher in the ranking than the default input device to receive the input data in the physical room.

18. The system of claim 16, wherein the activating the first component or the second component comprises activating an automated speech recognition (ASR) device or ASR software system to process the input data.

19. The system of claim 16, wherein the action comprises at least one of: displaying a message on a graphical user interface, playing of a sound, and vibrating of a device.

20. The system of claim 16, further comprising:
determining, based on the input data, a number of hotword misses in the time interval prior to a detected hotword event,
wherein every utterance of a spoken word detected following detecting an utterance of a hotword is treated as part of a user command until a command termination condition occurs,
wherein a hotword miss is an utterance of a hotword that was not previously detected; when the number of hotword misses in the time interval prior to the detected hotword event is greater than a threshold, activating an input device of the plurality of input devices that is different than the default input device in the physical room to receive the input data or activating a new hotword to be used as a triggering mechanism for identifying commands from the input data.

21. A non-transitory, computer-readable storage medium storing one or more sequences of instructions which when executed cause one or more processors to perform:
receiving component data related to a plurality of components in a physical room, including a plurality of input devices and a plurality of output devices, the component data including a ranking of multiple components of the plurality of components;
continuously receiving, by the processor located in the physical room, input data generated by a default input device of the plurality of input devices, the input data including digital sound data;
detecting an utterance of a spoken word from specific input data including specific digital sound data;
generating, in response to the detecting, one or more sound metrics;
wherein a first sound metric comprises a speech metric for the specific digital sound data;
wherein a second sound metric comprises a noise level metric for digital sound data corresponding to a time interval prior to detecting the utterance;
when the first sound metric of the one or more sound metrics meets a first criterion, activating a first component of the plurality of components for improving the first sound metric;
when the second sound metric of the one or more sound metrics meets a second criterion, activating a second component of the plurality of components for improving the second sound metric,
wherein the activating the first component or the second component comprises activating a hotword to be used as a triggering mechanism for identifying commands from the input data;
causing one or more input devices of the plurality of input devices or one or more output devices of the plurality of output devices to execute an action that alerts a user of the activated component.

* * * * *

UNITED STATES PATENT AND TRADEMARK OFFICE
CERTIFICATE OF CORRECTION

| | | |
|---|---|---|
| PATENT NO. | : 12,243,519 B2 | Page 1 of 1 |
| APPLICATION NO. | : 17/518099 | |
| DATED | : March 4, 2025 | |
| INVENTOR(S) | : Mohammad Niknazar et al. | |

It is certified that error appears in the above-identified patent and that said Letters Patent is hereby corrected as shown below:

In the Claims

Column 24, Line 62, Claim 13, delete "wherein determining the number of hotword hits or misses" and insert --wherein determining the number of hotword misses--

Signed and Sealed this
Twelfth Day of August, 2025

Coke Morgan Stewart
*Acting Director of the United States Patent and Trademark Office*